Aug. 8, 1950 — C. G. ODUM — 2,518,054
FENDER MOUNTED DIRECTIONAL SIGNAL BOX
Filed Dec. 30, 1947 — 3 Sheets-Sheet 1

INVENTOR.
Clyde G. Odum.
BY Victor J. Evans & Co.
ATTORNEYS

Aug. 8, 1950  
C. G. ODUM  
2,518,054  
FENDER MOUNTED DIRECTIONAL SIGNAL BOX  
Filed Dec. 30, 1947  
3 Sheets-Sheet 2
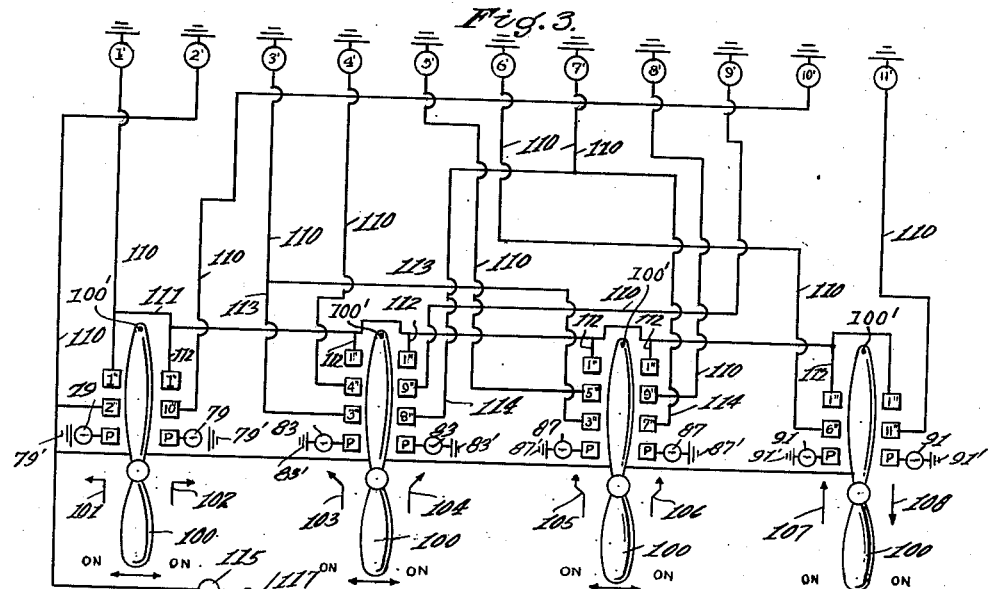
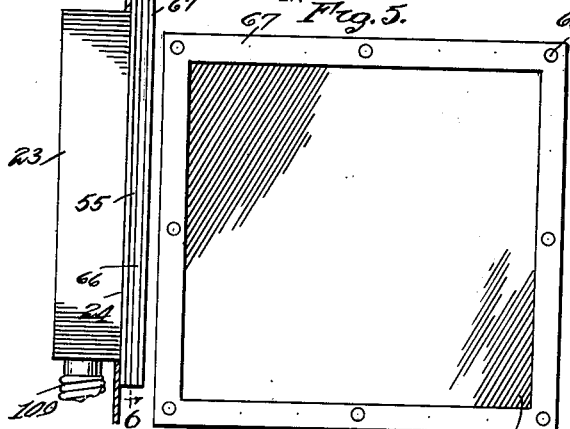
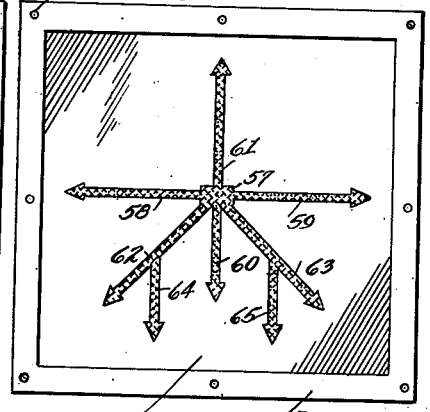
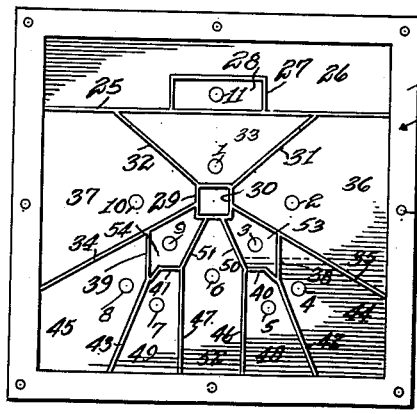
INVENTOR.  
*Clyde G. Odum.*  
BY *Victor J. Evans & Co.*  
ATTORNEYS Aug. 8, 1950      C. G. ODUM      2,518,054
FENDER MOUNTED DIRECTIONAL SIGNAL BOX Filed Dec. 30, 1947      3 Sheets-Sheet 3

INVENTOR.
Clyde G. Odum.
BY Victor J. Evans & Co.
ATTORNEYS

Patented Aug. 8, 1950

2,518,054

UNITED STATES PATENT OFFICE 2,518,054

FENDER MOUNTED DIRECTIONAL SIGNAL BOX

Clyde G. Odum, Punta Gorda, Fla.

Application December 30, 1947, Serial No. 794,732

1 Claim. (Cl. 177—327)

This invention relates to improvements in directional signal lights for automobiles.

An object of the invention is to provide a directional signal light that is adapted to be mounted on the fenders of an automobile, flush therewith, so that the signal light does not project beyond the contour of the fender in which it is installed.

Another object of the invention is to provide a signal light that will provide eight different and distinct signal arrows which can be used to give twelve different signal operating positions.

A further object of the invention is to provide a signal light that is easily repaired and, provided with efficient and accurate actuating control means, will give positive directional signals, which signals are indicated on a control board conveniently located near the driver of the automobile.

With the above and other objects and advantages in view, the invention consists of the novel details of construction, arrangement and combination of parts more fully hereinafter described, claimed and illustrated in the accompanying drawings in which:

Figure 3 is a diagrammatic view of the wiring system of the signal device;

Figure 4 is a side view of the signal box as installed in a fender shown in section;

Figure 5 is a front view of Figure 4;

Figure 6 is a sectional view on the line 6—6 of Figure 4;

Figure 7 is a front view of the box with the lens removed therefrom;

Figure 1:
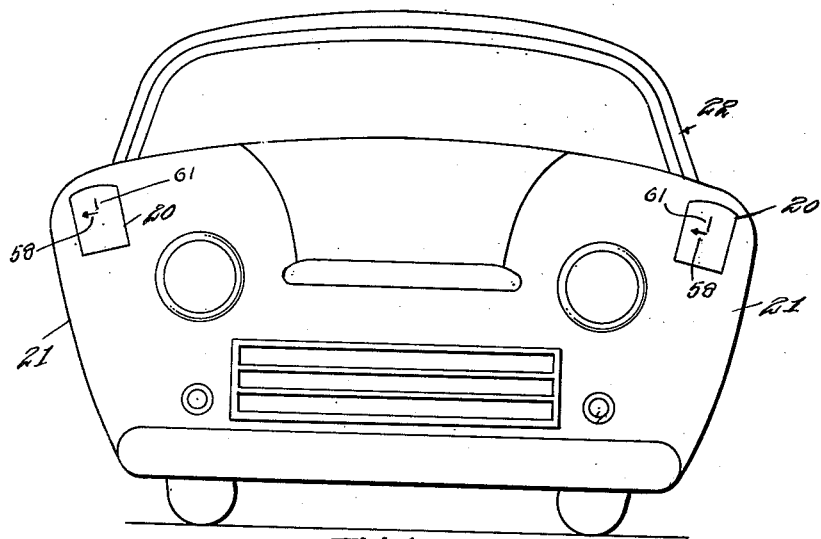
Figure 1 is an elevational front view of an automobile with an embodiment of the invention installed in the front fenders and indicating a right turn.
Figure 2:
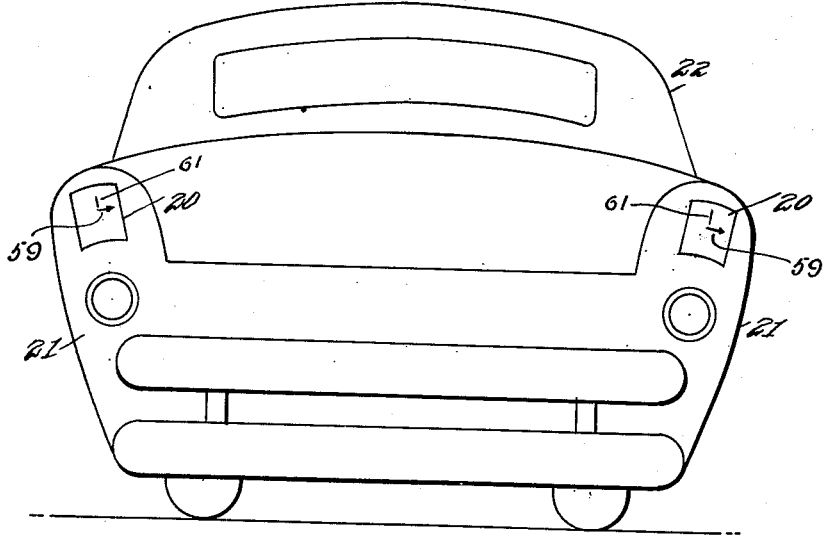
Figure 2 is an elevational rear view of an automobile with the right turn being indicated.

Referring more in detail to the drawings, the reference numeral 20 designates the signal light embodying the invention which is adapted to be installed in the front fenders 21 of an automobile 22 flush with the contour of the fender.

The signals are located in the fenders so that they will be visible day or night to give a positive signal indicating the operational direction of the automobile on which they are mounted.

The signal 20 comprises a signal box 23 which is substantially square in cross-section and is provided with a marginal flange 24 which extends at right angles from the box, as shown in Figures 4 and 7.

The box 23, internally thereof, is provided with a transverse partition 25, adjacent the bottom thereof. This partition provides a compartment 26 at the bottom of the box. A substantially U-shaped partition 27, extending into the compartment 26, and engaging the partition 25 at its ends, forms a compartment 28, in which a bulb 11 is positioned in a suitable socket.

Approximately at the center of the box, a substantially square partition 29 provides the compartment 30. Diverging from the partition 29, in upwardly and outwardly inclined relation thereto, are the partitions 31 and 32 respectively, which form the compartment 33 in which a bulb 1 is positioned in a suitable socket.

Partitions 34 and 35 diverging from the partition 29 in downwardly and outwardly inclined relation to the partition 29, together with the partitions 31 and 32, form compartments 36 and 37 respectively. The compartment 36 has a bulb 2 positioned therein in a suitable socket, and the compartment 37 has the bulb 10 positioned therein in a suitable socket.

Extending downwardly from the partitions 34 and 35, respectively, are the partitions 38 and 39 respectively which, at their lower ends, are joined by the curved portions 40 and 41 respectively which are at a substantially flat angle to the partitions 38 and 39, and lie in the same plane. At the point where one end of each of the partitions 40 and 41 joins the partitions 38 and 39, partitions 42 and 43 diverge downwardly in an outwardly inclined relation to the partitions 38 and 39. Partitions 35, 38 and 42 form the compartment 44 in which the bulb 4 is positioned in a suitable socket. Partitions 34, 39 and 43 form the compartment 45 in which a bulb 8 is positioned in a suitable socket.

Partitions 46 and 47 are joined to the opposite ends of the partitions 40 and 41, and diverge downwardly therefrom at right angles to the partitions 40 and 41. Partitions 40, 42 and 46 form the compartment 48, in which the bulb 5 is positioned in a suitable socket, and partitions 41, 43 and 47 form the compartment 49 in which the bulb 7 is positioned in a suitable compartment.

Partitions 50 and 51, diverging downwardly from the partition 29 to join the inner ends of the partitions 40 and 41 form with these partitions and partitions 46 and 47, the compartment 52 in which the bulb 6 is positioned in a suitable socket.

Partitions 35, 38, 40, 50 and 29 form the compartment 53 in which the bulb 3 is positioned in a suitable compartment, and partitions 34, 39, 41, 51 and 29 form the compartment 54 in which the bulb 9 is positioned in a suitable socket.

Each bulb is, therefore, positioned in a separate compartment, so that the illumination of one bulb will not extend over into the adjoining compartment. It is understood that the box 23 must be made in right and left hand pairs, and reversely mounted, so that the signals, front and rear, will correspond with each other. Therefore, the box 23 is positioned in Figure 6 as it would be mounted on a front fender, the box being reversely mounted on a rear fender.

Positioned on the flange 24 is the opaque plate 55, which carries the transparent directional indicia 56 comprising the central substantially square-shaped portion 57. Extending horizontally from the portion 57, in horizontal plane relation to each other, at opposite sides of the portion 57, are the arrows 58 and 59 respectively. Extending in vertical relation to the portion 57, in the same vertical plane with each other, on opposite sides of the portion 57, are the arrows 60 and 61 respectively. Extending from each lower corner of the portion 57 in downwardly inclined relation to the portion, and to each other, are the arrows 62 and 63 respectively. The arrow 64 extends downwardly in vertical relation to the arrow 62 and parallel to the arrow 60, while the arrow 65 extends downwardly in vertical relation to the arrow 63 and parallel to the arrow 60.

The arrows and the portion 57 are treated in some suitable manner to be distinguishable in the opaque plate 55. Placed over the plate 55, is the frosted or clear lens 66, through which the indicia will be visible when illuminated. A rim 67, when placed over the lens 66, will retain the plate and lens in position when suitable fasteners are inserted through the flange openings 68 and 69 and 70 of the rim, plate and flange respectively.

Figure 8:
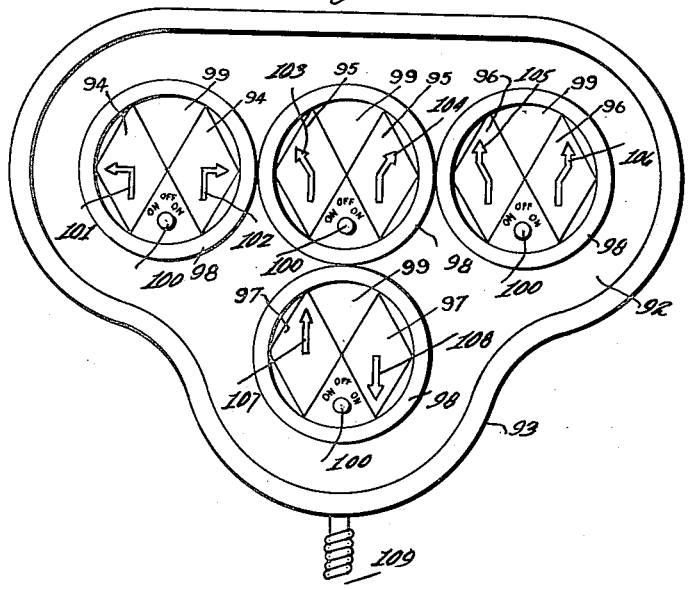
Figure 8 is a front view of the control box with the lens in place.
Figure 9:
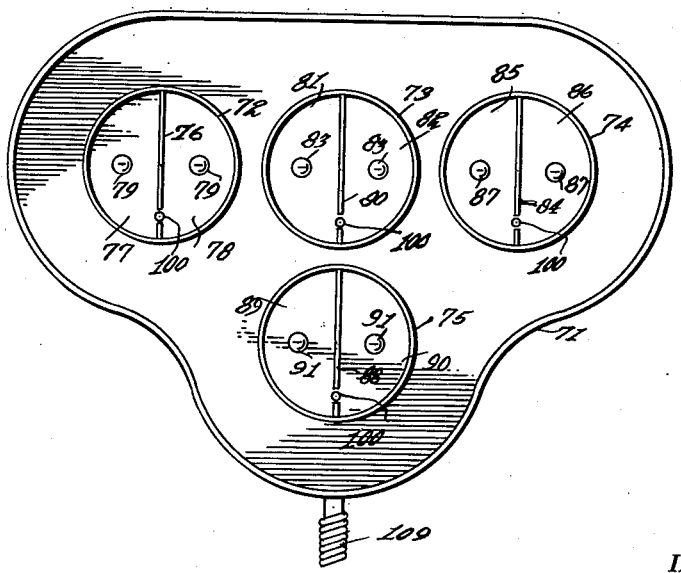
Figure 9 is a front view of the control box with the lens removed.

In Figure 8, the front of the pilot control box 71 is shown, and this box is provided vertically thereof with circular partitions 72 to 75 respectively. A vertical partition 76 divides the area confined by partition 72 into compartments 77 and 78 respectively, in which are positioned bulbs 79 in suitable sockets. A vertical partition 80 divides the area confined by partition 73 into compartments 81 and 82 respectively, in which are positioned bulbs 83 in suitable sockets. A vertical partition 84 divides the area confined by partition 74 into compartments 85 and 86 respectively, in which are positioned bulbs 87 in suitable sockets. A vertical partition 88 divides the area confined by partition 75 into compartments 89 and 90 respectively, in which are positioned bulbs 91 in suitable sockets.

Thus, the bulbs are housed in separate compartments so the illumination from one bulb will not extend into the adjoining compartments of the other bulbs.

A plate 92 is secured by a rim 93 on the face of the box 71, and circular plates 94 to 97 are secured to the plate 92 by rims 98.

Each of the plates 94 to 97 carries triangular shaped lens partitions 99, and a three-way toggle switch 100, which is available to the driver of the automobile. As shown in Figure 3, each switch 100 is pivoted at 100' so that movement to one position at the right or left will energize the series of contacts engaged by each switch, as will be later described.

The plate 94 carries indicia 101 and 102 for right and left turns respectively. The plate 95 carries indicia 103 and 104 for right and left curves respectively. The plate 96 carries indicia 105 and 106 for right and left S curves respectively, and plate 97 carries forward and backward directional signals 107 and 108 respectively.

The boxes 23 and 71 are connected through the means of a multiwired cable 109, so that the pilot bulbs in the box 71 will be illuminated to correspond with the directional signal bulbs in the box 23.

In Figure 3, it will be noted that each of the bulbs 1 to 11 respectively is provided with its individual grounds 1' to 11'' respectively.

Each bulb is connected to its respective post, which are numbered 1' to 11'' respectively by a suitable wire 110. Since the bulb 1 is used in all positions, it is connected to subsequent posts 1'' by a suitable wire 111 and accompanying leads 112 form this wire, as shown. The bulb 3 is also used more frequently than some of the other bulbs, so it is connected to subsequent posts 3'' by leads 113 from its wire 110. The bulb 7 is also used frequently, and it is connected to subsequent posts 7'' by leads 114.

The pilot bulbs 79, 83, 87 and 91 are provided with the respective grounds 79', 83', 87' and 91' so that they will be illuminated as the switches 100 are moved in to right or left on positions.

A blinker switch 115 is interposed in the wiring 116 to cause the bulbs to blink. The wiring 116 passing through the fuse 117 is connected to the battery 118 and the wiring 116 connects all the switches 100, as shown.

The indicia shown in Figure 8 can be illuminated to indicate various directions of travel such as right turn forward bulbs 1 and 2, or left turn forward bulbs 1 and 10; right curve forward bulbs 1, 3 and 4 and left curve forward bulbs 1, 9 and 8; as a right S curve forward or for passing a car to the left, bulbs 1, 3 and 5; as a left S curve forward or for passing a car on the right about to make a left turn, bulbs 1, 9 and 7; for signals straight ahead, bulbs 1 and 6 and for backing, bulbs 1 and 11.

The indicia on the plates resembles the conventional roadside markers so that there is no mistaking the signals given.

The small diamond shaped lens in the control box resembles roadside markings so that a modern appearance is obtained.

The arrows are elongated to permit better visibility day or night and are suitable for highway, as well as city driving.

The lights in the fenders are visible both front and rear, and to the sides. Driving will be safer since more positive signals are obtainable. Arm signals at night which are hardly visible can be illuminated without fear of collision from following cars, since the driver can give positive signals as to his intended direction of travel.

The compartment prevents the illumination of the bulbs from overlapping, so that the signals are not confused.

It is believed that from the foregoing description, the construction and operation of the signal will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

In a directional signal of the type described, having a signal box that is adapted to be mounted in an automobile fender flush with the contour thereof, partitions in said box dividing said box into a plurality of light-proof compartments, and a circuit for each bulb adapted to be selectively connected to the current source of an automobile, a signal bulb in each compartment, the improvement comprising an opaque plate over the face of the box, transparent directional indicia in said plate that is adapted to be illuminated by the bulbs, said indicia comprising a central square shaped transparent portion, transparent arrow portions extending from said square shaped portion in horizontal and vertical relation thereto, a pair of transparent arrow portions depending from said square shaped portion at an angle thereto and one arrow portion of each pair being positioned intermediate of a vertical and a horizontal arrow portion, and a second pair of transparent arrow portions depending from said first pair of arrow portions parallel to said vertically disposed arrow portions and means for selectively energizing the individual bulbs, said means being connected to the current source of the automobile.

CLYDE G. ODUM.

REFERENCES CITED

The following references are of record in the file of this patent:

UNITED STATES PATENTS

| Number | Name | Date |
|---|---|---|
| 1,274,347 | Tayc | July 30, 1918 |
| 1,345,557 | Shane | July 6, 1920 |
| 2,120,288 | McCready | June 14, 1938 |
| 2,214,447 | Bave | Sept. 10, 1942 |